United States Patent [19]
Forget et al.

[11] Patent Number: 5,485,436
[45] Date of Patent: Jan. 16, 1996

[54] SYSTEM AND METHOD FOR ACCESSING INFORMATION ON STORED OPTICAL DISCS

[75] Inventors: Robert Forget, Laval; Kurt Hibchen, Montreal; Robert Parenteau, Notre-Dame de L'Ile Perrot; Robert Daoûst, Boucherville; Francois Beaumont, Laval; Yves Chagnon, Montreal; Bernard Lefebvre, Montreal; Marc-Antoine Archambault, Montreal, all of Canada

[73] Assignee: National Film Board of Canada, Montreal, Canada

[21] Appl. No.: 65,710

[22] Filed: May 24, 1993

[51] Int. Cl.$^6$ ............................ G11B 17/22; B66C 1/00; B25J 15/10
[52] U.S. Cl. .............................. 369/36; 414/739; 901/39
[58] Field of Search ................... 369/34, 36, 38, 369/39, 178, 191–194; 414/728, 729, 738, 739, 741, 736, 753; 364/478, 479; 360/92; 901/6, 39; 294/87.1

[56] References Cited

U.S. PATENT DOCUMENTS

| | | | |
|---|---|---|---|
| 4,682,313 | 7/1987 | Miyake | 369/39 |
| 4,907,889 | 3/1990 | Simone | 360/92 |
| 4,913,617 | 4/1990 | Nicholson | 414/729 |
| 5,000,561 | 3/1991 | Akagawa et al. | 414/741 |
| 5,237,468 | 8/1993 | Ellis | 360/92 |

FOREIGN PATENT DOCUMENTS

| | | | |
|---|---|---|---|
| 0506489 | 9/1992 | European Pat. Off. | 360/92 |
| 1-210287 | 8/1989 | Japan | 414/736 |
| 1342721 | 10/1987 | U.S.S.R. | 414/736 |

Primary Examiner—John H. Wolff
Assistant Examiner—William J. Klimowicz

[57] ABSTRACT

An automatic disc handling system and method for retrieving and positioning information carrying discs between a storage position to a position of use is described. A displaceable robot having a pair of robotic arms is controlled by a computer connected to a robot controller and instructed to move to discrete positions, either in front of storage racks where a plurality of superposed sliding trays containing one or more discs are stored, or to a plurality of playback units disposed at a position of use to move selected ones of the disc to and from these positions as requested by a person accessing the discs from a remote station. The robot is provided with a tray engaging element to move the tray in and out of its storage position, and the robotic arms of the robot are each provided with a picker mechanism to engage and remove the discs from the trays or the playback units and transport them to effect a function as dictated by the computer and the robot controller. The robotic arms are also adapted to invert the disc for access to information recorded on both sides of the disc.

25 Claims, 12 Drawing Sheets

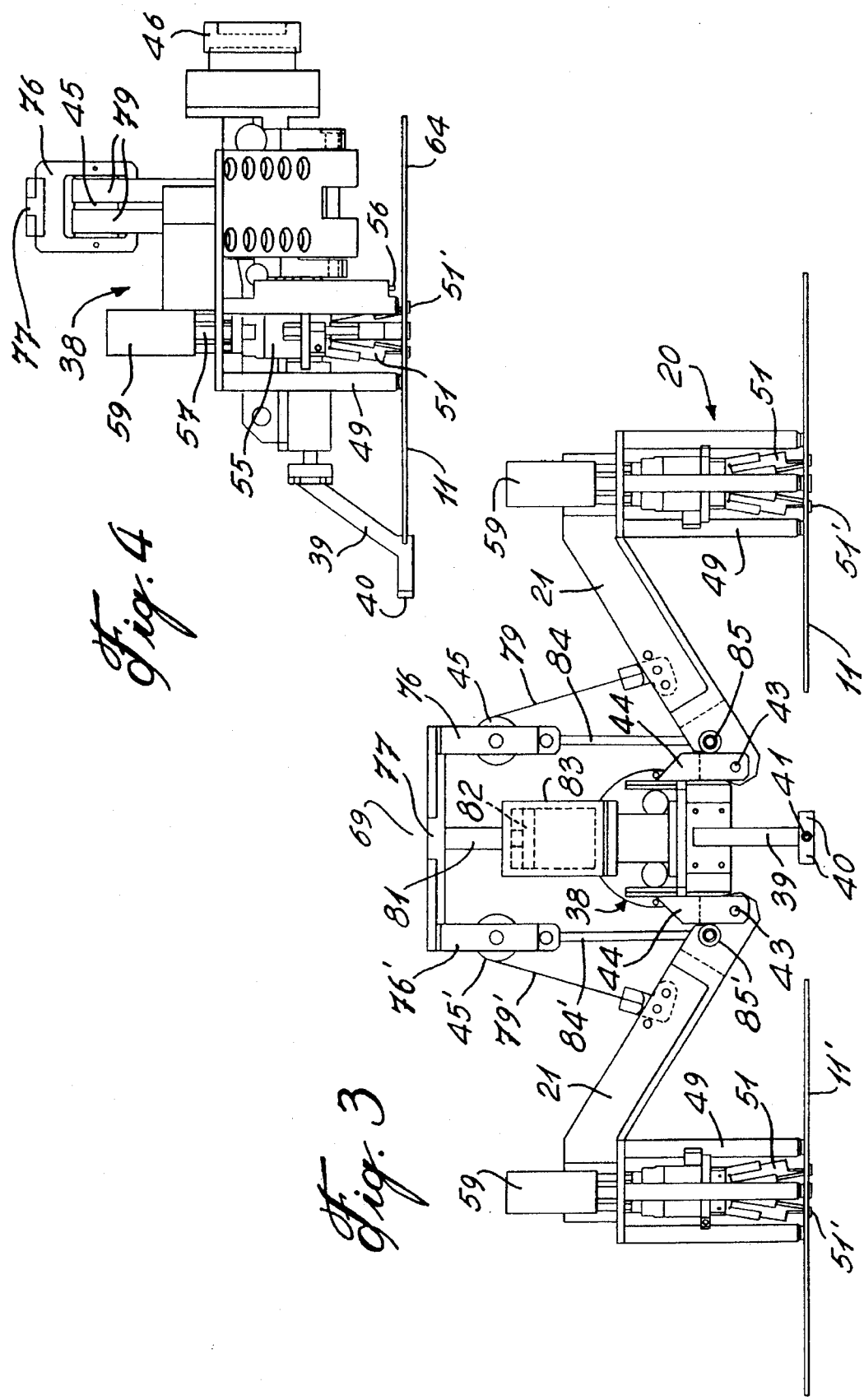

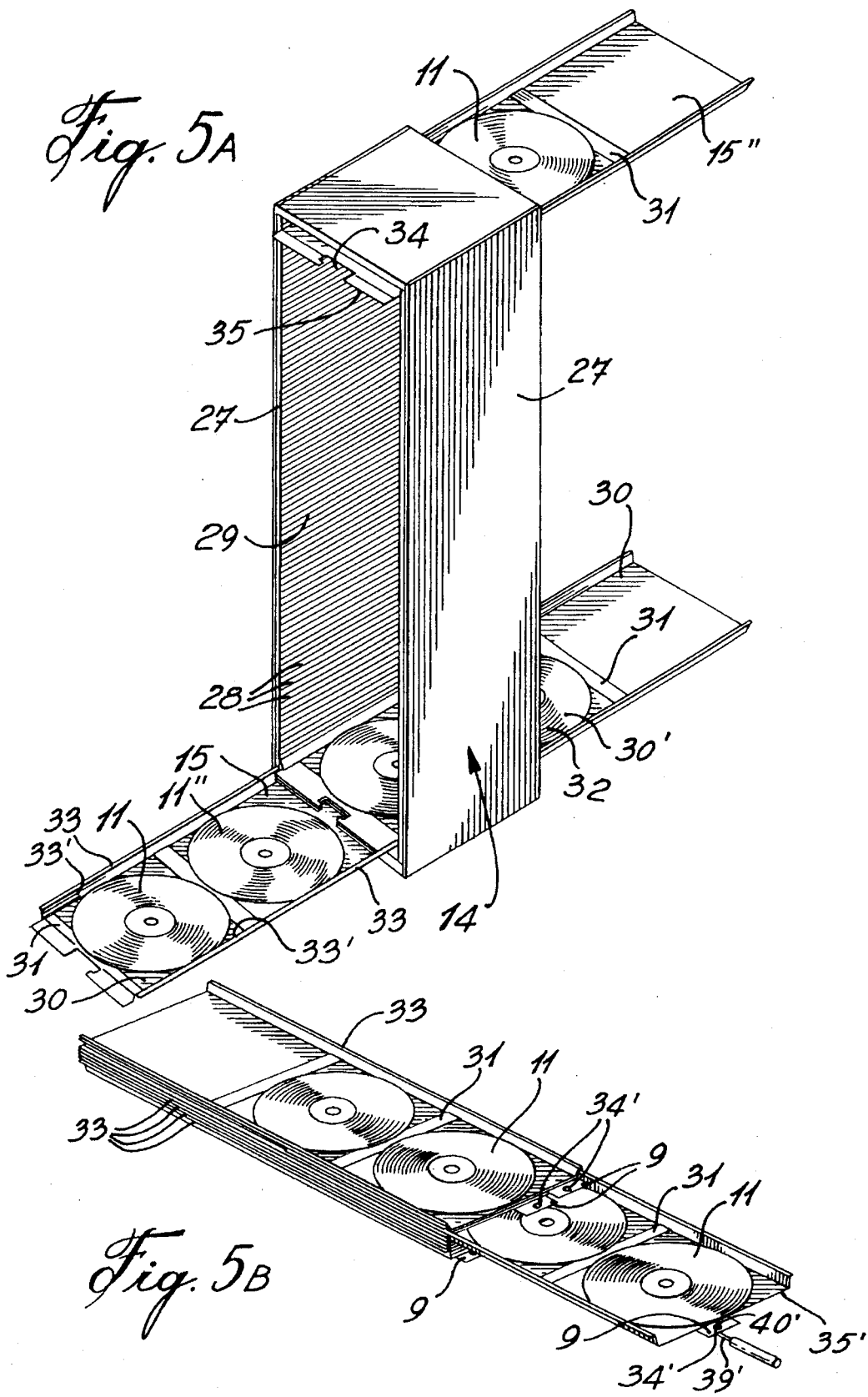

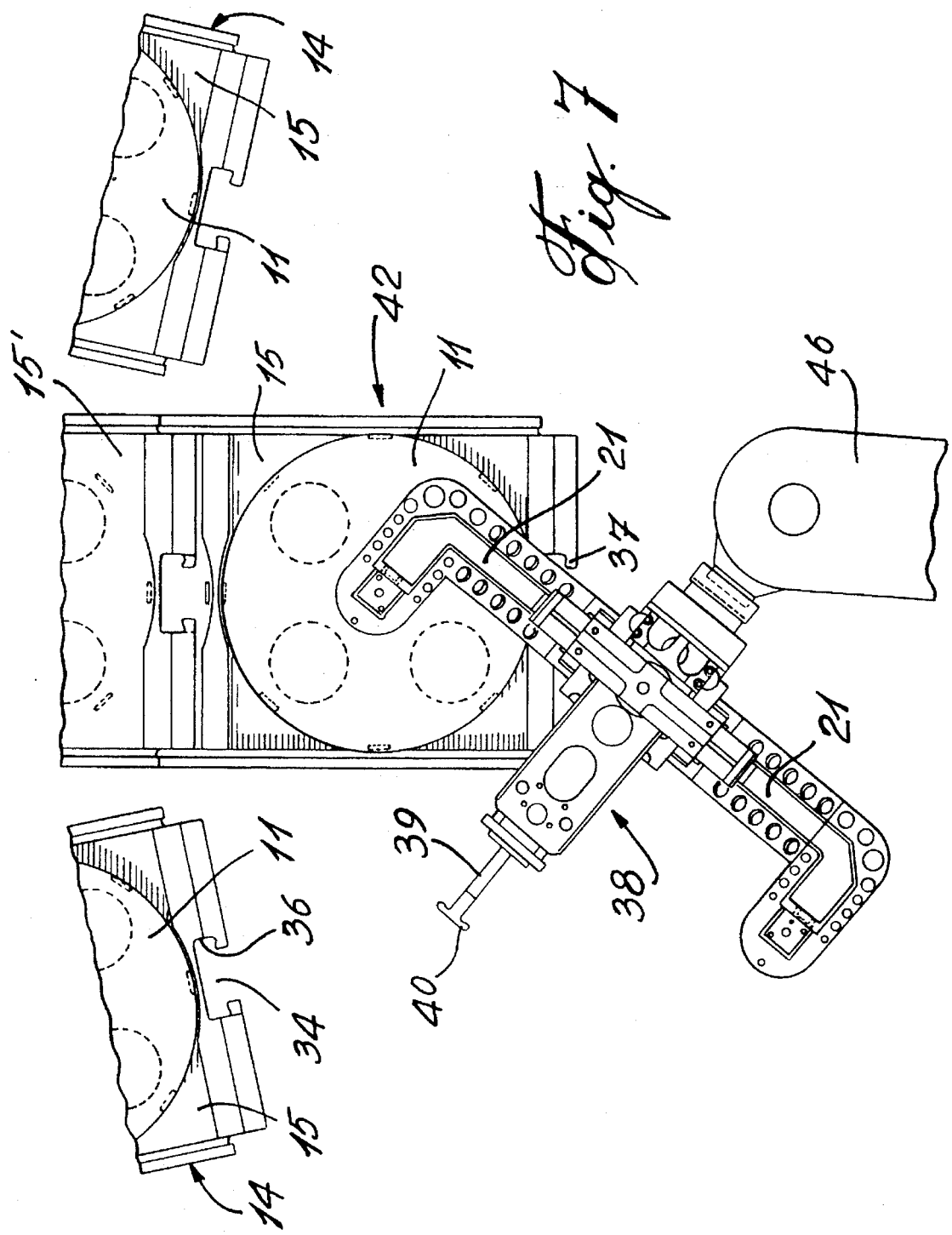

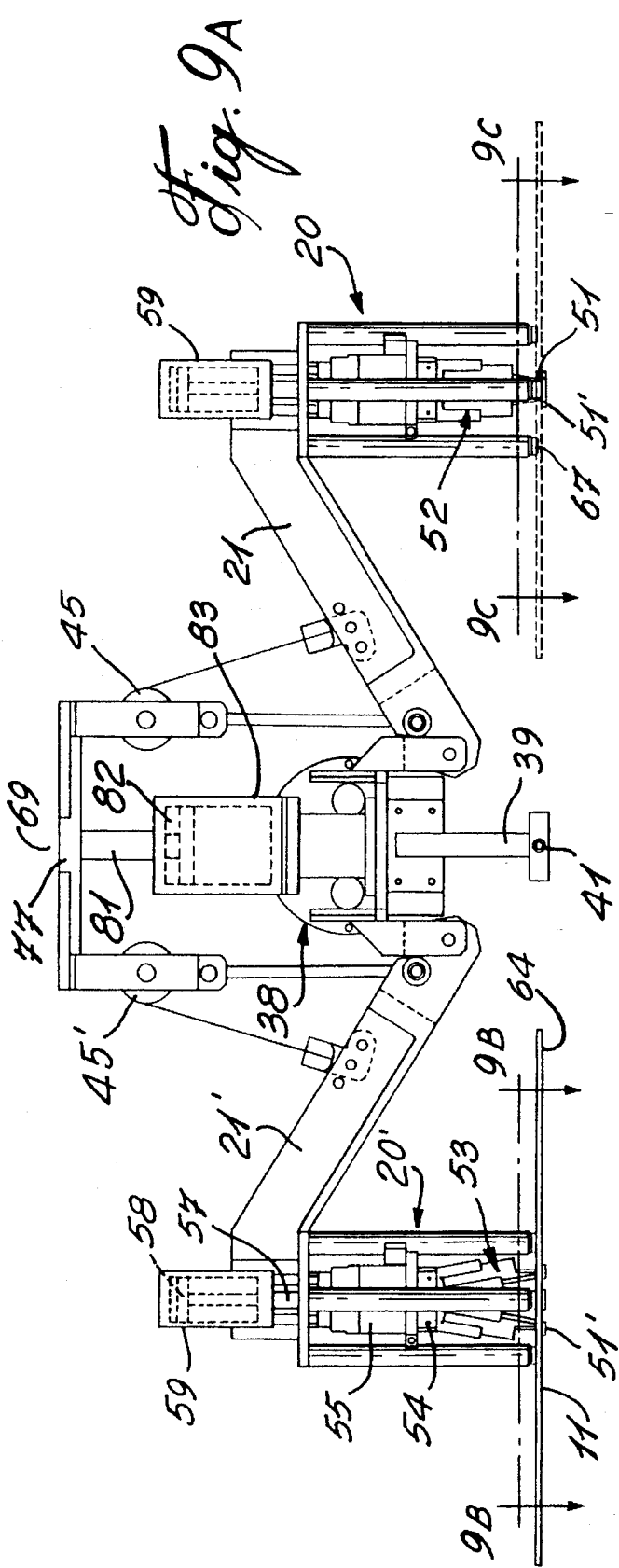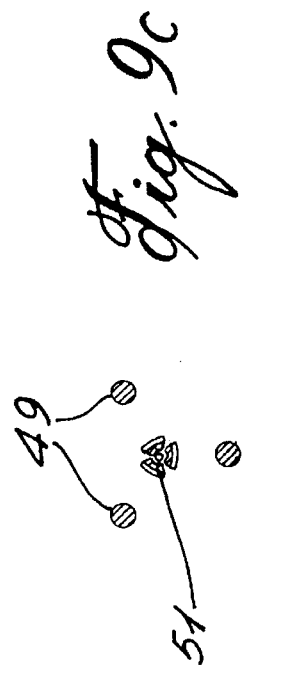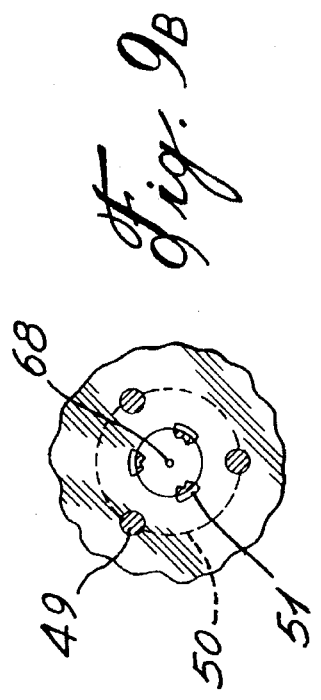

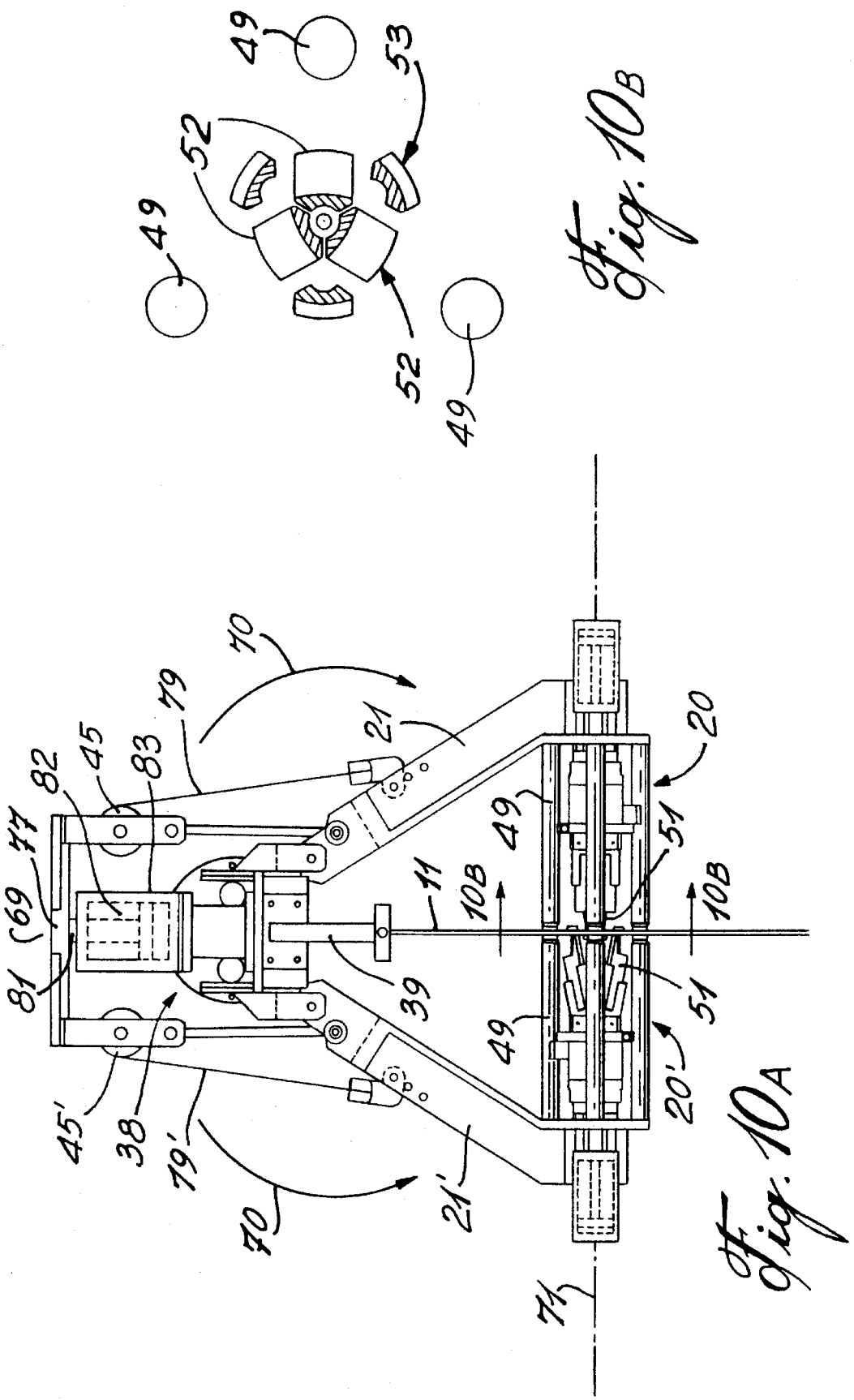

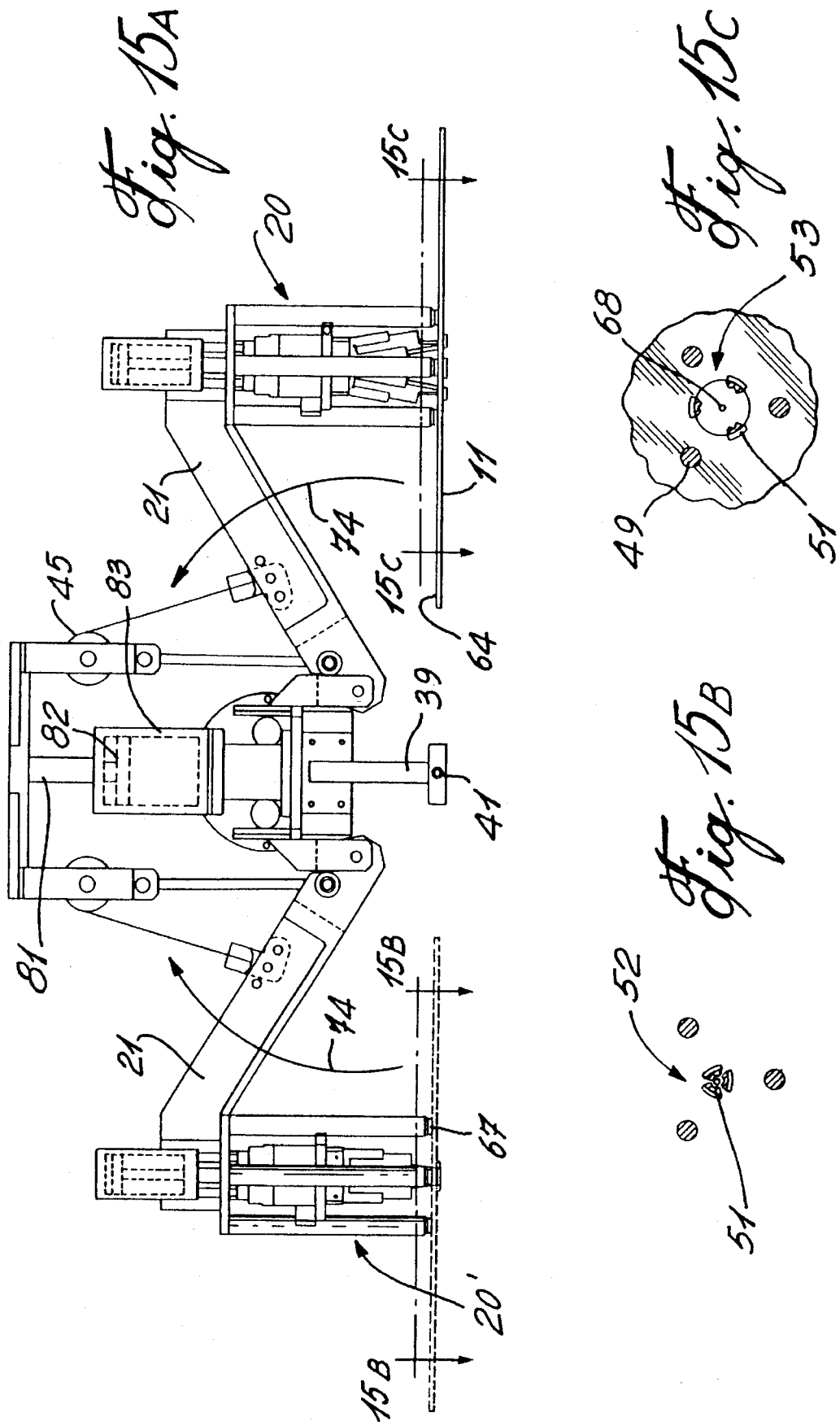

SYSTEM AND METHOD FOR ACCESSING INFORMATION ON STORED OPTICAL DISCS

TECHNICAL FIELD

This invention relates to an automatic disc handling system and method for retrieving and positioning information carrying discs between a storage position to a position of use, and wherein the system includes a robot which is controlled by a computer and a robot controller operated by demand signals fed to the computer from a remote station occupied by a user person.

BACKGROUND ART

Various information carrying disc handling systems are known, such as disclosed in U.S. Pat. No. 4,286,790 which relates to an optical disc changer apparatus. This apparatus is capable of moving information carrying discs from storage positions to playback apparatus. The apparatus can also contain a plurality of these optical discs having a very large capacity of data stored thereon. The system utilizes a carriage having at least two positioning and retracting carriers. Gripping means is coupled to the carriers to grip a protective cartridge having an optical disc enclosed therein. The apparatus accordingly handles cartridges and not discs. The cartridges are also stored along a vertical storage position within the housing, such as a playback device, and therefore has limited storage capacity.

Various laser disc players are also known, and employ magazines for storing a plurality of discs for listening to audio information stored on these discs in a selected order. Usually these players can handle anywhere from two to five discs which are loaded therein by hand. Examples of such devices are disclosed, for example, in U.S. Pat. Nos. 4,797,865 and 5,103,437. However, in these patents it can be seen that the discs are stacked in a horizontal manner immediately adjacent a disc reading device, and all located within a small compact housing.

Optical disc handling systems wherein discs are stored in horizontal fashion in cabinets are disclosed in U.S. Pat. Nos. 4,040,159 and 4,989,191 as examples thereof. A plurality of horizontal cases are superposed one on top of the other, and a robotic means is used to transfer these discs towards a playback device that may be integrated with the system. However, such devices have various drawbacks and the storage of discs is not easily expandable.

SUMMARY OF INVENTION

The present invention relates to an improved automatic disc handling system capable of storing thousands of discs and transferring them to various locations while keeping data on their location.

It is a feature of the present invention to provide an automatic disc handling system and method for retrieving and positioning information carrying discs, such as video discs, between a storage position where several discs are stacked closely spaced in horizontal stacks and positioned in drawers which are retractable by robot means, and wherein a disc is picked up and transferred to a position of use where it is placed in a playback device.

Another feature of the present invention is to provide an automatic disc handling system and method wherein a disc may be retrieved from a playback device and positioned in any of a plurality of storage drawers for storage.

Another feature of the present invention is to provide an automatic disc handling system and method for retrieving a disc from a playback device and wherein the disc is automatically inverted and repositioned in the playback device or a storage drawer.

Another feature of the present invention is to provide an automatic disc handling system and method for retrieving and positioning information carrying discs between a storage position to a position of use, and wherein the storage position is easily expandable.

Another feature of the present invention is to provide an automatic disc handling system and method for retrieving and positioning information carrying discs between a storage position to a position of use wherein a plurality of playback units are provided, and wherein said system utilizes a single robot having a pair of robotic arms and capable of handling two information carrying discs simultaneously for playback and/or storage.

Another feature of the present invention is to provide an automatic disc handling system and method for retrieving and positioning information carrying discs between a storage position to a position of use wherein the storage position is comprised of a plurality of horizontally disposed trays superposed in a dense compact position in frames disposed vertically along an arc of a circle and to each side of a plurality of playback unit stations which is also positioned on the arc with a robot being disposed at the center of the arc and acts as a server.

Another feature of the present invention is to provide an automatic disc handling system and method for retrieving and positioning video information carrying discs between a storage position to a selected one of a plurality of playback units at a position of use, and wherein said discs are selected by a user person, at a remote station, and sending demand signals to a computer connected to a robot controller who controls a robot which is instructed to retrieve a requested video information carrying disc for playback to the remote station occupied by the user person.

According to the above features, from a broad aspect, the present invention provides an automatic disc handling system for retrieving and positioning information carrying discs between a storage position to a position of use. The system comprises displaceable robot means having a pair of robotic arms. Each of the robotic arms has actuable engaging means for engaging, transporting and disengaging one of the discs. Storage means having a plurality of superposed sliding trays containing one or more disc retaining cavities on a top surface thereof are also provided. The trays have engageable means for displacing the trays from their storage position to a retracted loading or unloading position. The robot means has tray engaging means for engaging the engageable means of a selected one of the trays to displace same from its storage position to the loading and unloading position and back to the storage position. Control means is provided to cause the displaceable robot means to move to a selected position, where the robotic arms engage the selected one of the disc at the selected storage position or position of use to effect a specific work function.

According to a further broad aspect of the present invention there is provided a method of automatically retrieving and positioning information carrying discs between a storage position where the discs are stored on a plurality of horizontally disposed sliding trays stacked in vertical columns, and a position of use in a disc playback unit. The method comprises identifying a disc to be retrieved and to be positioned in the playback unit. A robot having a pair of pivoting robotic arms is displaced to a position where the disc identified is located. The disc is caused to be positioned to a retrievable position. One of the robotic arms of the robot is displaced to a disc engaging position to align a picker mechanism above an engaging aperture of the disc. Disc aperture engaging fingers are then positioned through the engaging aperture and are actuated to move from a retracted position to an expanded disc engaging position. The engaging fingers are retracted to displace the disc in clamping engagement between the fingers and abutment means on a top surface of the disc adjacent the aperture. The disc is then moved to the playback unit where it is released on a support base of the playback unit.

According to a still further broad aspect of the present invention the method comprises identifying the location of a disc to be retrieved and to be positioned in a playback unit. A robot having a pair of robotic arms is displaced to a position where the disc identified is located. A storage tray containing the disc identified is engaged and pulled from a storage position to a disc retrieval position. One of the robotic arms of the robot is displaced above the disc at the retrieval position and engages the disc with a picker means. The disc and the robotic arm are then displaced from the retrieval position and the tray is pushed back to its storage position. The robot is then displaced to a disc playback unit to position the disc therein.

According to a still further broad aspect of the present invention the robot may be maintained at a stand-by position at the position of use to await instructions from a computer control means. The robot also has a disc in one of its robotic arms which is to be stored once the robot is given instructions by a computer connected to a robot controller to retrieve another disc for placement in another playback unit. When the robot is given those instructions the further disc to be retrieved is removed from a storage tray, and the disc being held for storage is then placed in that tray. The location of that stored disc is then maintained in memory by the computer, and the robot moves to another playback unit to position the retrieved disc therein.

According to another broad aspect of the present invention the method also comprises retracting a disc from a playback unit after the unit has terminated its playback function, and a new disc held by one of the robotic arms of the pair of robotic arms of the robot is then placed in the playback unit.

Another feature of the present invention comprises a robot having a pair of robotic arms capable of transferring an information carrying disc from one arm to the other to invert the disc to provide access to information recorded on the opposed side of the disc.

BRIEF DESCRIPTION OF DRAWINGS

A preferred embodiment of the present invention will now be described with reference to the accompanying drawings in which:

FIG. 3 is a front view showing the construction of the pair of robotic arms secured to the head of the robot, and wherein an information carrying disc is held by each of the arms;

FIG. 4 is a side view of FIG. 3;

FIG. 5A is a perspective view showing the construction of a vertical storage frame in which sliding trays are secured;

FIG. 5B is a perspective view showing an alternative construction of the engageable means for engaging and pulling the trays from the storage frames;

FIG. 7 is a top view of the robot with a robotic arm disposed over a disc loading and unloading position of the tray and adjacent a plurality of vertical storage frames;

FIG. 9A is a front view showing a pair of robotic arms with one arm having a disc before transferring the disc to the other one of the arms;

FIGS. 9B and 9C are sectional end views respectively along lines 9B—9B and 9C—9C of FIG. 9A showing the relationship of the abutment members and the engaging fingers of each of the two picker mechanisms;

FIG. 10A is a front view of the robotic arms shown in an aligned disc transfer position;

FIG. 10B is a sectional end view along line 10B—10B of FIG. 10A showing the relationship of the abutment members and the engaging fingers of both picker mechanisms when in their position at FIG. 10A;

FIG. 15A is a front view showing the robotic arms back to their horizontal positions after the disc has been transferred from one picker mechanism to the other; and FIGS. 15B and 15C are sectional end views respectively along lines 15B—15B and 15C—15C of FIG. 15A showing the relationship of the abutment members and engaging fingers of both picker mechanisms of FIG. 15A.

DESCRIPTION OF PREFERRED EMBODIMENTS

Figure 1:
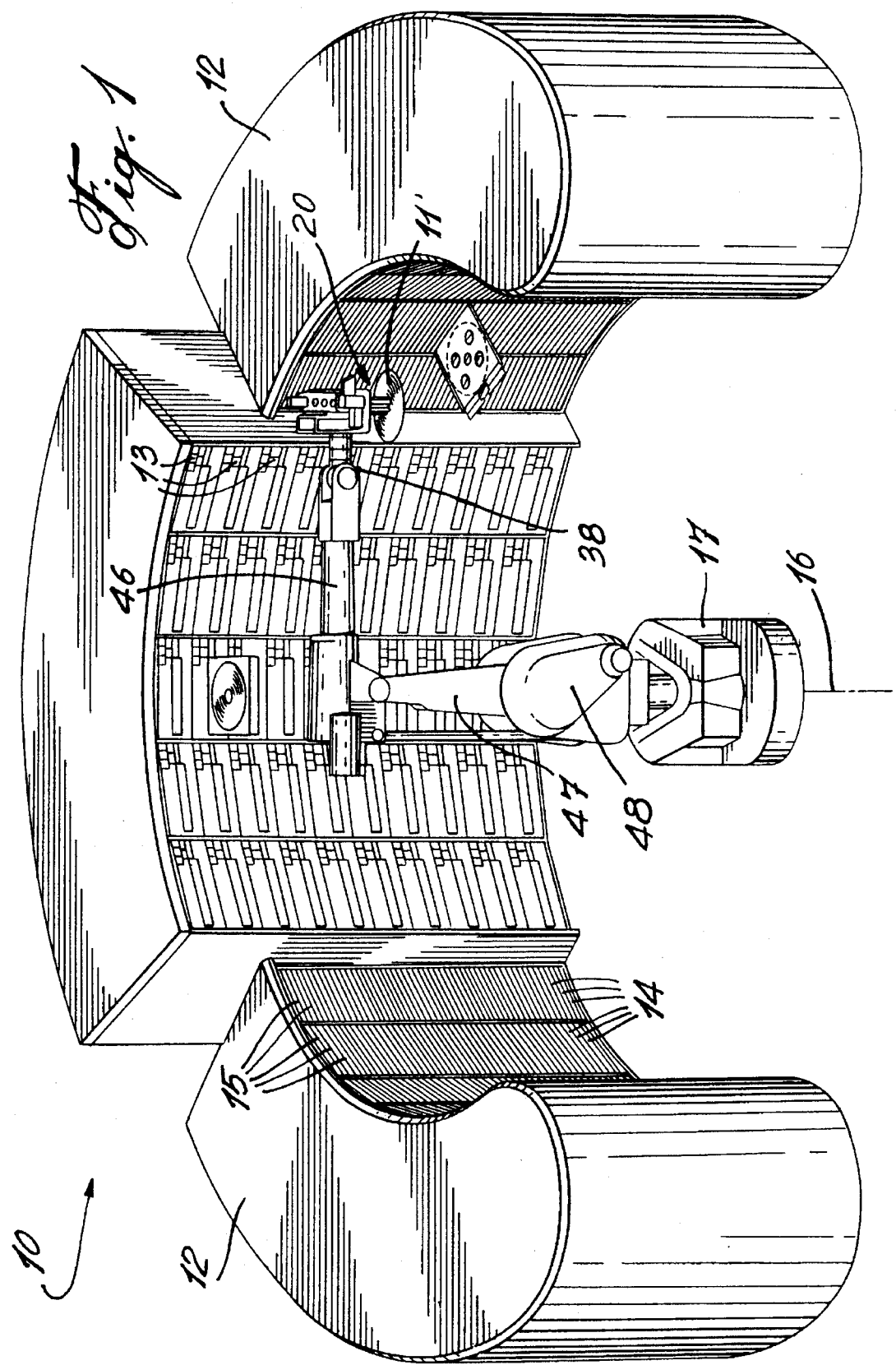
FIG. 1 is a perspective view of the automatic disc handling system for retrieving and positioning information carrying discs by robot between storage positions to a position of use.

Referring now to the drawings, and more particularly to FIG. 1, there is shown generally at 10 the automatic disc handling system of the present invention for retrieving and positioning information carrying discs, such as video discs 11 and 11' shown in FIG. 3, between storage positions 12 positioned to each side of a plurality of bays of playback units 13. In the particular instance the discs have a diameter of about 12 inches. The bay containing the playback units 13 is herein considered as the position of use whereas the bays 12 contain a plurality of storage positions. The storage positions are defined by a plurality of vertical storage frames 14, each containing a plurality of horizontally superposed sliding trays 15, the details of which will be described later. As can be seen, the storage bays 12 and the bay containing the playback units 13 are disposed on an arc of a circle. On the center axis 16 of this arc is disposed a pivoting robot 17. This robot acts as a server to manipulate the discs at and from their storage position in the storage bays to their position of use in the playback units 13.

Figure 2:
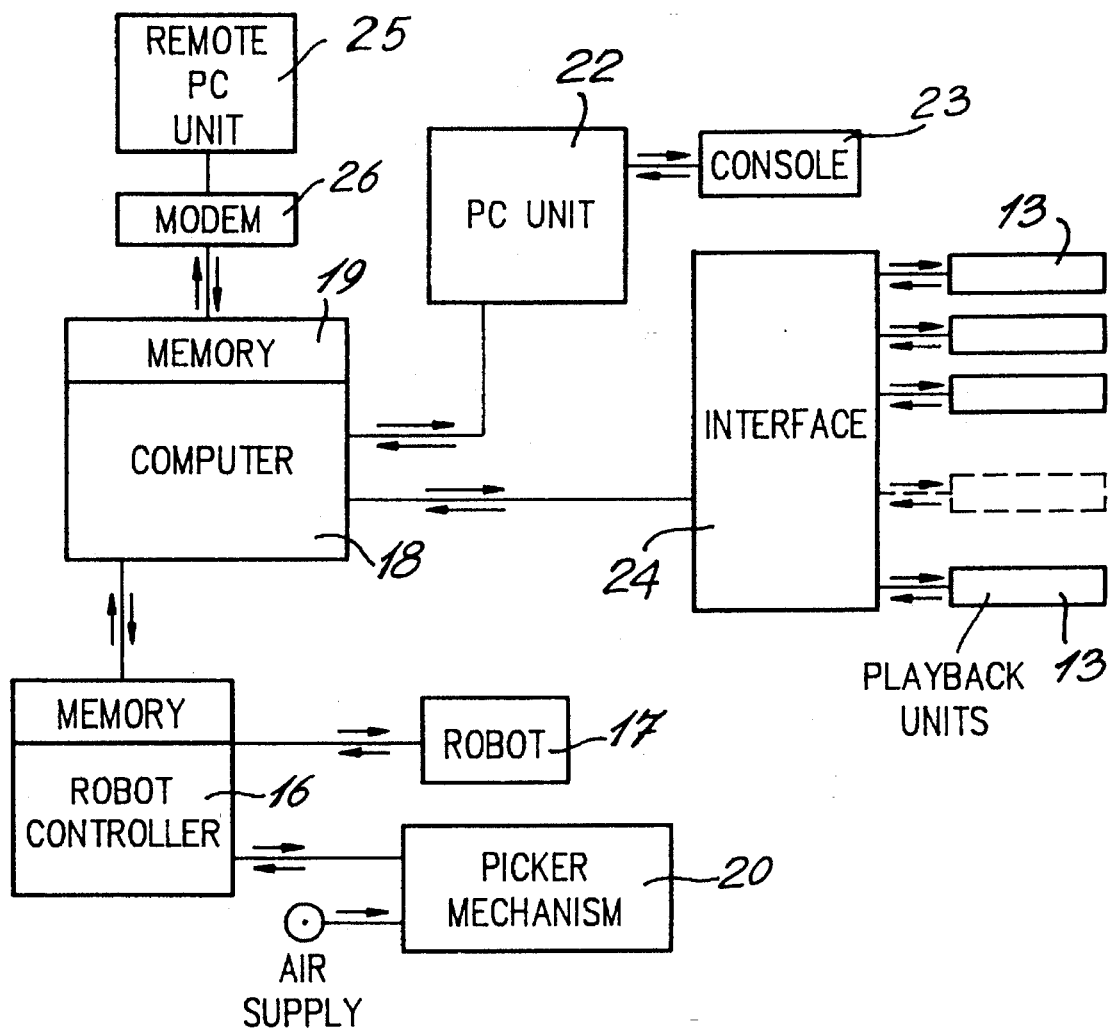
FIG. 2 is a block diagram showing the system of the present invention.

Referring now to FIG. 2, there is shown a simplified block diagram of the automatic disc handling system of the present invention. The robot 17 is controlled by a robot controller 16 connected to a programmed computer 18 which is provided with a memory 19 to retain various information therein, such as the location address of each disc stored in the sliding drawers 15 or positioned in the playback units 13, or held by one or both of the picker mechanisms of the robotic arms 21, as illustrated in FIG. 3.

The computer controller 18 is controlled by at least one personal computer unit 22 which is located remotely from the robot area, such as in an adjacent room, and which is operated by a user person. A console 23 or viewing screen is associated with the PC unit so that the user has access to the audio and video information on the disc. The console could be a speaker system if the discs being handled were audio discs. In the particular instance, the disc handled by the system contain video and audio digitized information signals which are scanned by a laser scanner (not shown) provided in the playback unit to provide the user person both audio and video signals of the information accessed by the user person and stored on both sides of the disc. The playback units 13 are interfaced with the computer 18 via an interface circuit 24 which performs switching and control of a selected playback unit 13. As herein shown, the user person could also be located at a remote station, such as at 25, far away from the area where the discs are stored, and these discs can be accessed through a modem 26 connected to the computer 18 through telephone lines.

Referring now to FIG. 5A, there is shown the construction of the vertical storage frame and as herein shown the storage frame consists of a pair of vertically oriented side walls 27 held by end walls and each having a plurality of elongated parallel slots 28 formed in an inner side face 29 thereof. The slots 28 of each side wall 27 are in horizontal alignment with one another to receive a plurality of the sliding trays 15 in closely spaced parallel relationship. The trays 15 are elongated rectangular trays which may contain one or more discs 11 in disc retaining cavities 30' formed in the top surface thereof and separated by spacers 31. The cavities have a circular contour shape. The trays 15 are also provided with opposed guide flanges 33 elevated from the tray bottom wall 30 by suspension walls 33' and engaged by the slots 28 to position the trays in very close horizontally stacked relationship, as shown in FIG. 5B, with the distance between trays having a very small clearance. However, to overcome the retrieval problems of having closely spaced trays, each of the trays are provided with an engageable aperture 34 which is constructed so as to make it easy to grasp the tray to retrieve a disc.

Figures 6A, 6B:
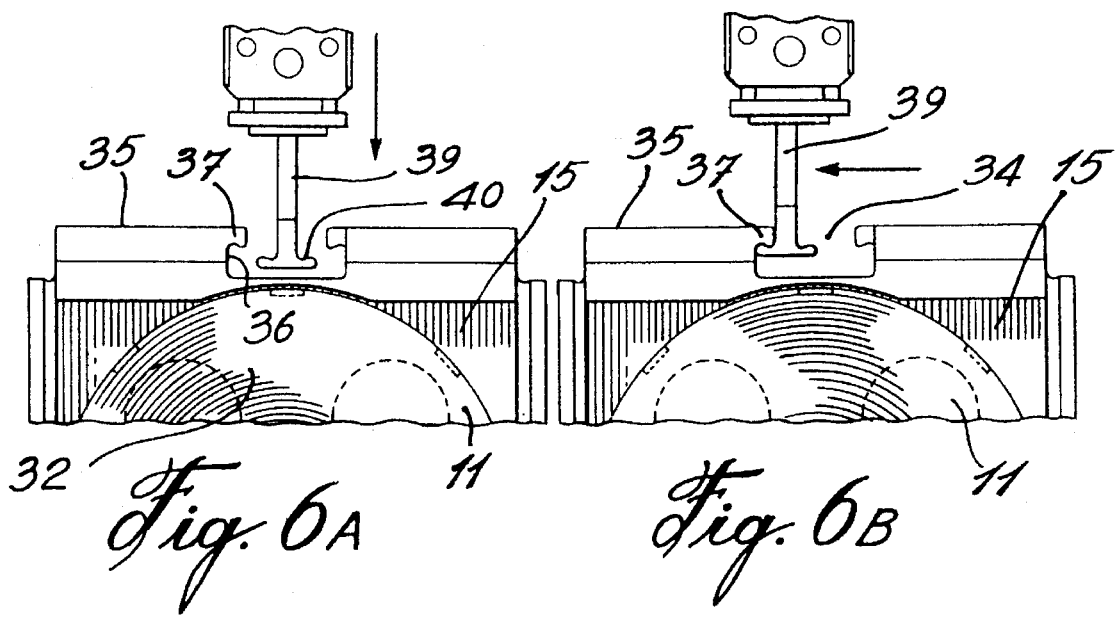
FIG. 6A is a fragmented top view showing the engageable aperture formed in the front edge of the sliding tray, and the finger element of the robot which engages with the aperture.
FIG. 6B is a view similar to FIG. 6A, but showing the engaging finger element moved to an engaging position.

Referring now additionally to FIGS. 6A and 6B, it can be seen that an engageable aperture 34 is formed in the front edge 35 of the trays 15, and is provided with an undercut groove 36 to one side thereof to define an engageable lip 37 on the right or the left side of the aperture 34. The trays are then stacked with their lips 37 of adjacent trays in an alternating sequence, as can be seen in FIG. 5A. Accordingly, the lips of adjacent trays are spaced a distance of two trays and will not interfere with one another when being engaged.

Figure 6C:
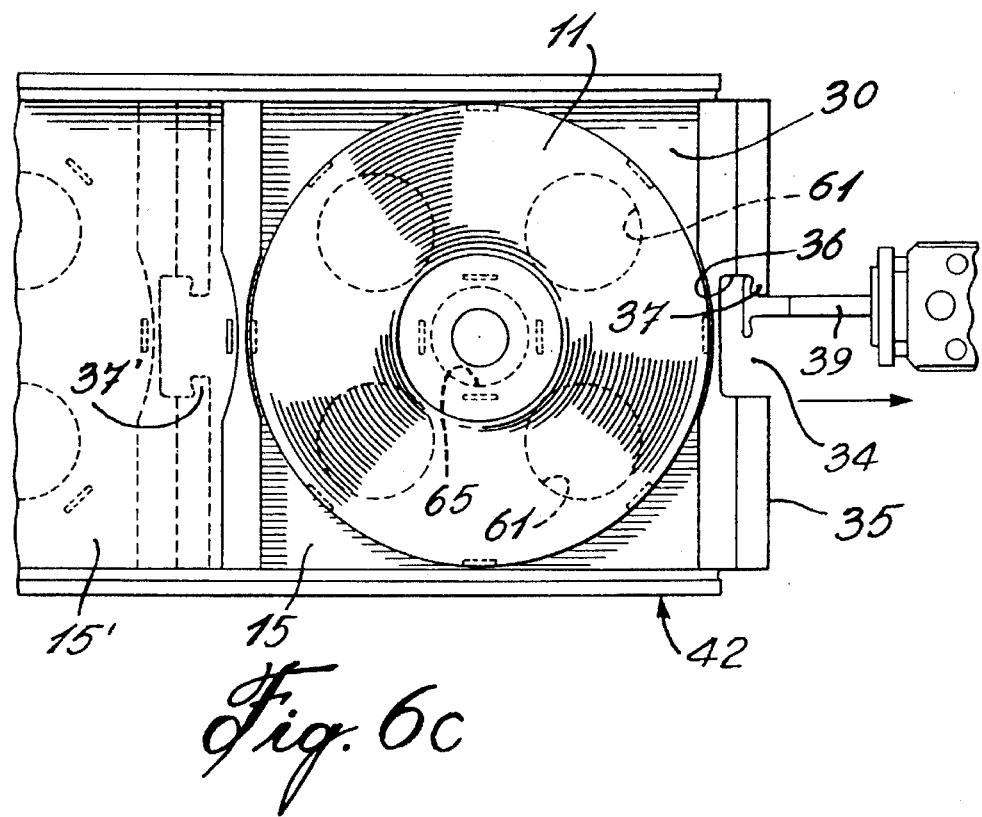
FIG. 6C is a top view showing a sliding tray having a single disc stored thereon, and illustrating the position of the engageable aperture of a tray positioned thereunder.

As shown in FIG. 3, the head 38 of the robot is provided with a tray engaging finger element 39 which is a T-shape finger element having opposed engaging arms 40. A tray is retracted from the storage frame 14 by the robot which places its finger element 39 with its T-shape fingers 40 directly within the aperture 34 and centrally thereof, as shown in FIG. 6A. An optical sensor 41, herein the end of a fiber optic cable, is located centrally of the end of the finger element between the arms 40 to check the alignment of the engaging arms 40 with the front edge 35 of the tray to be retracted. The finger engaging element is then moved to one side of the aperture 34 where the lip 37 is located, as shown in FIG. 6B, and then retracted, as shown in FIG. 6C, so that one of the engaging arms 40 engages the lip and retracts the drawer, as therein shown. This movement of the finger element 39 is effectuated by command signals from the robot controller 16.

The robot controller 16 has in a memory 20 the precise position of a selected tray to be retracted, as well as the position of the lip on that tray. The tray engaging finger is therefore automatically guided precisely to that position as stored in the memory 20 of the robot controller 16. The tray is then pulled to a loading and unloading position, as shown at 42 in FIG. 6C, where the disc 11 is then ready to be unloaded. As shown in FIG. 6C, the tray 15 is a rectangular tray carrying, in the particular instance, a single disc 11. The tray 15' positioned thereunder is also illustrated with its lip 37' positioned on the opposite side as the lip 37 of the uppermost tray 15. The selected disc 11 is thus in a position to be removed from its storage sliding tray 15. As can be seen in FIG. 5A, should the other disc 11" on a given tray be selected, the robot controller 16 also has in its memory the precise location of this other disc 11", and therefore pulls the tray accordingly.

Referring to FIG. 5B, there is shown an alternative construction of the engageable means for displacing the trays 15. The trays are formed with flat horizontal tabs 9 having an engageable aperture or hole 34' formed therein. The tab 9 of adjacent trays 15 in the storage frames 14 is disposed at different locations along the front edge 35' of the trays so as to permit for a larger clearance between vertically aligned tabs for ease of passage of the tray engaging element 39'. As shown in FIG. 5B, the tabs 9 are disposed at four distinct locations in the front edge 35' of the trays 15, thereby providing a clearance of three suspended trays between vertically aligned tabs.

The tray engagement element 39' is an L-shaped element herein constituted by a straight rod having a right angled engaging end 40' which is positionable into an aperture 34' of a selected tab 9 to engage and displace the tray 15 as above described.

As shown in FIG. 3, a pair robotic arms 21 are pivoted at pivot connections 43 to braces 44 of the head 38. A displaceable mechanism 69 causes the arms to simultaneously move along individual arcs about their pivot connections, as will be described later. The displacement of the arms 21 is commanded by the robot controller 16. As also shown in FIG. 1, the head 38 is secured to an articulation 46 at the end of a boom 47 which is also articulated to a robotic frame 48 where by the picker mechanisms 20 at the end of the arms 21 can be displaced to any angle in horizontal and vertical planes. The mechanism 69 consists in a pair of blocks 76 and 76' on which are respectively mounted pulleys 45 and 45' on which elongated metal spring bands 79 and 79' are wound. Such spring bands are provided to retain robotic arms in position in case of cylinder air supply failure. Connecting rods 84 and 84' secured to respective blocks 76 and 76' are pivotally connected to robotic arm 21 by pivots 85 and 85'. A bridge member 80 connects the blocks 76 and 76' and is secured to a piston rod 81 having a plunger 82 displaceable within an air-operated bi-directional cylinder 83.

Referring again to FIG. 3, it can be seen that the picker mechanism 20 is provided with three vertically disposed parallel abutment posts 49 equidistantly spaced from one another along a circumferential axis 50 of a circle, as shown FIG. 9B. Disposed on an inner circle arc of the abutment member are three articulated disc aperture engaging fingers 51 which are displaceable from a retracted position, as shown at 52 in FIG. 9A, to a disc engaging expanded position, as shown at 53 also in FIG. 9A. These fingers are secured on pivot connections 54 to an axially displaceable support air-actuating mechanism 55. Although there are three disc abutment posts 49 being shown and three aperture engaging fingers 51, it is conceivable that the picker mechanism could operate with only two of each of these, if they are properly shaped to carry on centering of a picked disc. It is also conceivable that the picker mechanism could be comprised solely by air-operated suction cups or a single cup attached to the free end of the robotic arms 21, and having sensors provided in close relationship thereof to locate the suction cups at desired locations on the disc. Various other sensors, such as sensor 68, as shown in FIG. 3, are located at different strategic positions with respect to the displaceable mechanisms, such as the air-actuating mechanism 55, for precise alignment and displacement, or for locating reference marks to provide precise operation of the robot in a manner well known in the robotic design art. More specifically, sensor 68 is provided to check over one of the tray apertures 61, if a selected disc is effectively in the position as stored in the computer memory 19. As also shown in FIG. 9A, the axial displacement actuating mechanism 55 is secured to a piston rod 57 having a plunger 58 displaceable within an air-operated cylinder 59.

As shown in FIG. 9A, the disc engaging fingers 51 at their retracted position 52 are closely spaced in alignment with one another. The fingers are also provided with a hook end 51' for engaging the disc 11, in a manner as will now be described.

As shown in FIG. 7, after the sliding tray 15 has been retracted to a disc loading and unloading position 42, the head 38 of the robot is then articulated to a disc engaging position so that one of the arms 21 has its picker mechanism 20 aligned directly above the disc engaging aperture 60 (see FIG. 6C) provided at the center of the disc 11. As also shown in FIG. 6C, the support wall 30 of the tray is provided with a plurality of apertures 61 to reduce the weight of the tray and for ventilation.

Figure 8:
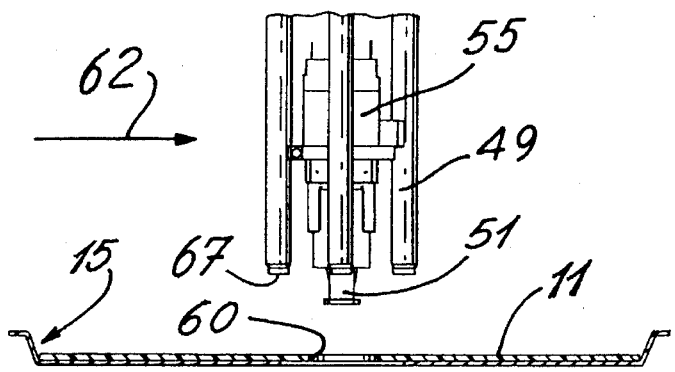
FIGS. 8A to 8D are simplified side views showing the operation of a gripper mechanism for engaging in the disc engaging aperture of an information carrying disc to remove same from its sliding tray.
Figure 8B:
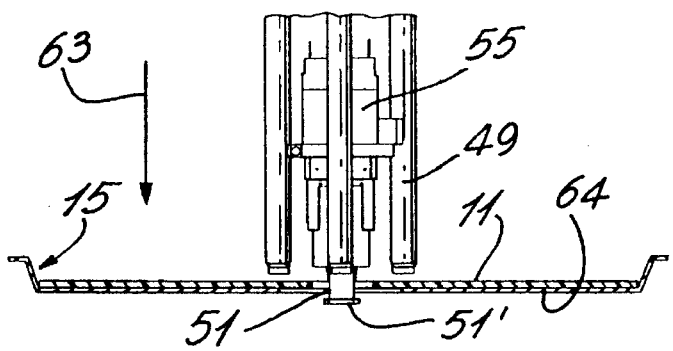

With the robotic arms 21 in their position, as shown in FIG. 7, the picker mechanism is then actuated to perform a disc engaging function, as illustrated by FIGS. 8A to 8D. As shown in FIG. 8A, the picker mechanism has been moved laterally in the direction of arrow 62 to position itself directly centered with the disc engaging aperture 60. The picker mechanism is then lowered to an engaging position by the displaceable mechanism 69 so that the aperture engaging fingers 51 move downwardly in the direction of arrow 63 to position itself within the aperture 60 with the hook ends 51' extending above the back side 64 of the disc 11.

Figure 8C:
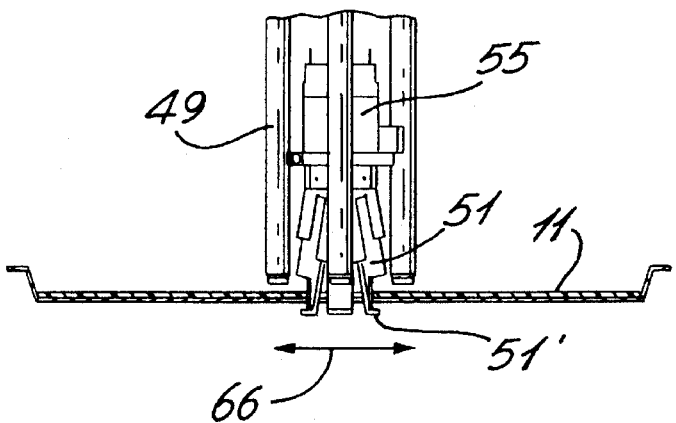
Figure 8D:
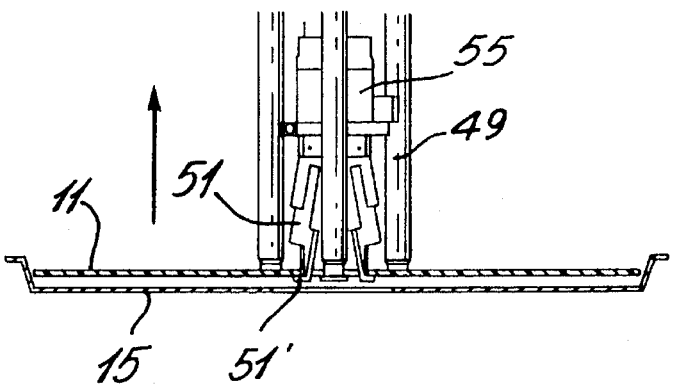

As shown in FIG. 6C, the tray support wall 30 is provided with a large central aperture 65 to provide a clearance about the disc engaging aperture 60 to permit engagement of these hook ends 51 with the back side 64 of the disc about the aperture 60. Once in this position the engaging fingers are pivoted by the actuating mechanism 55 to move to a disc engaging position with the hook ends 51' moving outwardly in the direction of arrows 66. After the fingers and the hook ends are in an engageable position, as shown in FIG. 8C, the piston rod 57 is then retracted within its air-operated cylinder 59 to retract the disc and urge it in clamping position between the hook ends 51' and the cushion bumpers 67 secured at the free ends of the abutment posts 49, as shown in FIG. 8D.

With the disc thus engaged, the head of the robot then realigns itself with the tray having been pulled to its loading and unloading position 42, as shown in FIG. 7, and the tray engaging finger element 39 relocates itself within the engaging aperture 34, and pushes the tray back to its storage position, as shown by tray 15" in FIG. 5A. The articulated arm 46 of the robot then swings the head 38 to locate it adjacent a selected one of the plurality of playback units 13. Each of the playback units 13 is associated with a specific one of a plurality of PC units 22 located in a viewing room or a remote unit 25 located at a far end. The computer 18 now gives a command signal to the selected playback unit 13 to automatically place its drawer or disc receiving platform (not shown) to a disc loading or unloading position, as is obvious to a person skilled in the art and as provided with many of these units currently on the marketplace. The computer 18 contains in its memory various information about the selected playback unit. If there is an optical disc in that unit, the free robotic arm 21 of the robotic head will first pick up the disc in that playback unit by its picker mechanism, as previously described with reference to FIGS. 8A to 8D. The head will then articulate again to position the disc removed from the storage tray to a position above the loading platform of the playback unit and deposit the disc thereon at a precise location by retracting its aperture engaging fingers 51 to position them to their retracted position, as shown in FIG. 9A.

Because the optical discs 15 as herein utilized contain digitized recorded information on opposed sides thereof, it may become necessary to invert the disc after one side of the disc has been scanned and transmitted to the user console 23. The computer controller has the information in memory that such a disc reversal is necessary at a specific time, and this will be effectuated automatically by the robotic arms, in a fashion as illustrated in FIGS. 9A to 15C. As shown in FIG. 9A, a robotic arm 21' has a disc 11 retained by its picker mechanism 20', and it is now necessary to transfer that disc to the picker mechanism 21 so that the back side 64 will now face upwardly when the disc is retained by the picker mechanism 20 of the robotic arm 21. As shown in FIGS. 9B and 9C, the aperture engaging fingers 51 of the picker mechanism 20' are in an engaged position with the disc 11 retained captive between their hook ends 51' and the abutment post 49 while the aperture engaging fingers 51 of the other picker mechanism 20 are in a retracted position, as shown at 52 in FIG. 9A.

As shown in FIGS. 10A and 10B, the robotic arms 21' and 21 are then caused to articulate in a downwardly arcuate direction, as shown by arrows 70, so that the engaging fingers 51 of the pair of robotic arms 21 and 21' are aligned about a common axis 71 extending through the center of the disc aperture 60. The abutment posts 49 of opposed picker mechanisms 20 and 20' are also aligned on opposed sides of the disc 11. FIG. 10B illustrates the position of the aperture engaging fingers with respect to one another, with one set of fingers being at their retracted position 52 and the other set at their disc engaging position 53 and offset from one another.

Figure 11A:
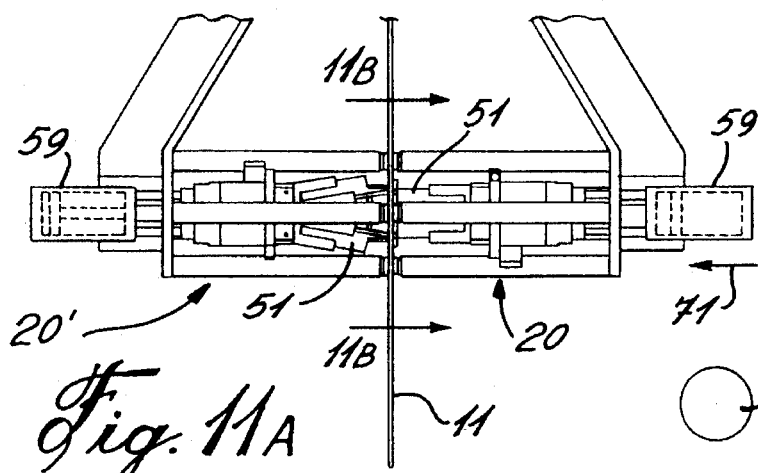
FIGS. 11A, 12A, 13A and 14A are front views of the picker mechanisms showing their sequence of operation in transferring a disc from one picker mechanism to the other.
Figure 11B:
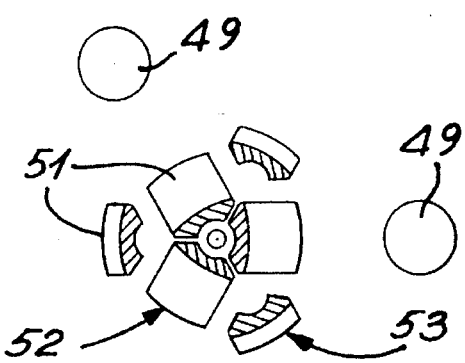
FIGS. 11B, 12B, 13B and 14B are sectional end views respectively along lines 11B—11B to 14B—14B of FIGS. 11A to 14A showing the relationship of the abutment members and the engaging fingers of both picker mechanisms.

The next step in this transfer sequence is illustrated in FIGS. 11A and 11B. As shown by arrow 71, the piston cylinder 59 of the picker mechanism 20 is actuated to move the aperture engaging fingers 51 thereof through the aperture 60 and the disc 11 and between the aperture engaging fingers 51 of the picker mechanism 20' which are in their engaging position. The relationship of the aperture engaging fingers 51 is illustrated in FIG. 11B.

Figure 12A:
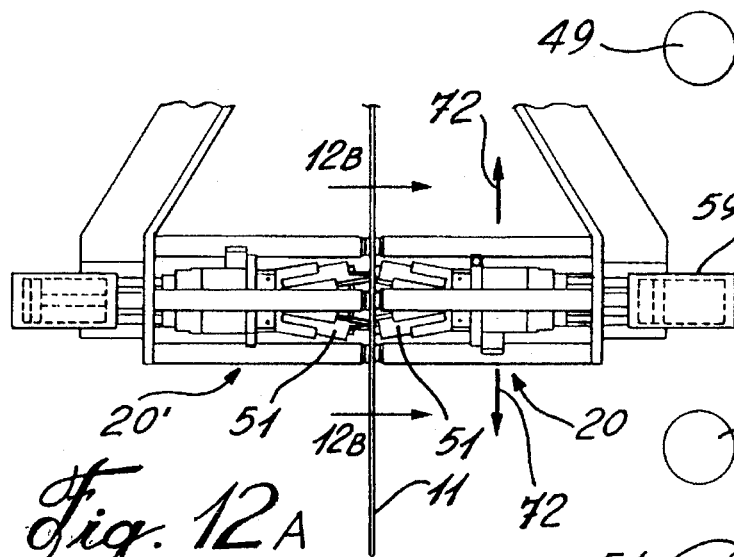
Figure 12B:
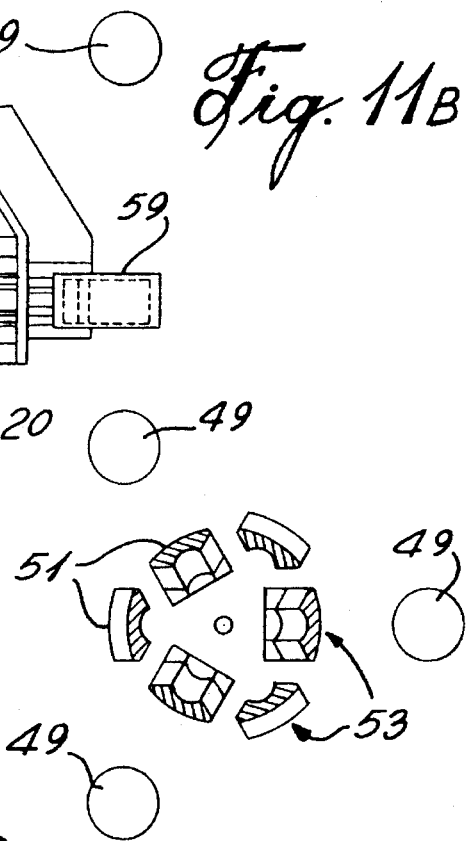

The next step in the operation, as illustrated in FIG. 12A, consists in actuating the aperture engaging fingers 51 of the picker mechanism 20 to place them in a disc engaging position, and accordingly these fingers will move outwardly in the direction of arrows 72. The relationship of the aperture engaging fingers 51 of both picker mechanisms is illustrated in FIG. 12B.

Figure 13A:
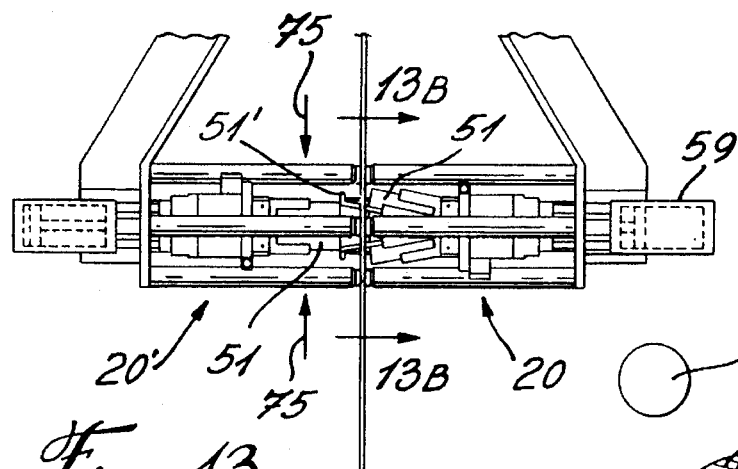
Figure 13B:
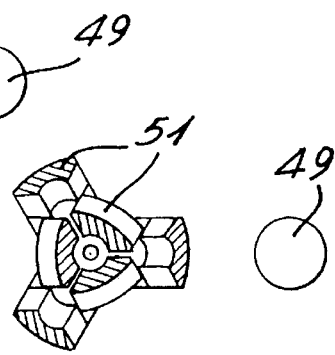
Figure 14A:
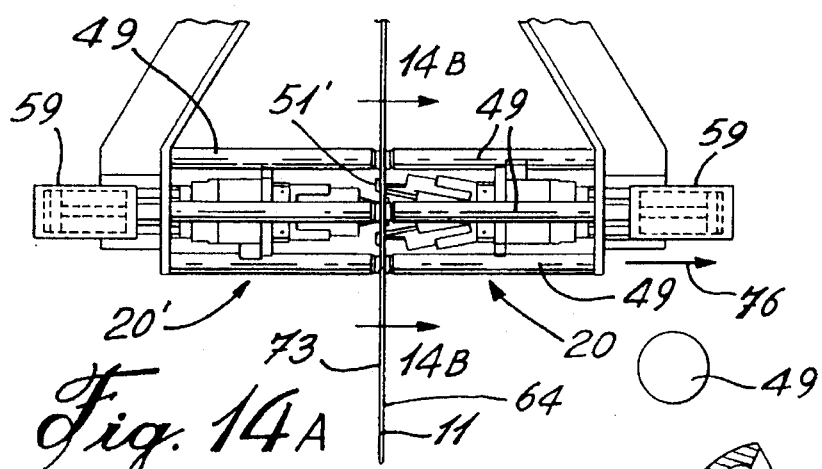
Figure 14B:
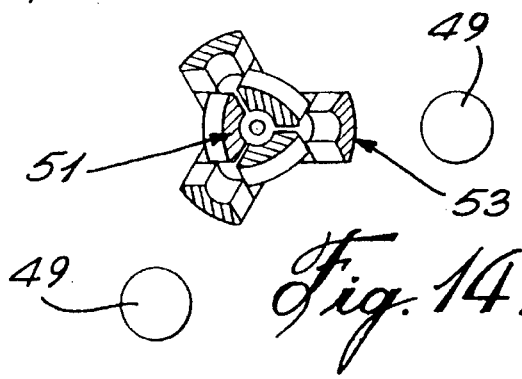

As shown in FIG. 13A, the aperture engaging fingers 51 of the picker mechanism 20' then retract to their retracted position in the direction of arrows 75, and the relationship of these aperture engaging fingers is illustrated in FIG. 13B. The cylinder 59 of the picker mechanism 20 is again operated in the direction of arrow 76 to withdraw the hook ends 51' of the fingers against the top face 73 of the disc 11, while the rear face 64 faces the picker mechanism 20. The relationship of the aperture engaging fingers 51 is again illustrated in FIG. 14B. The cylinder 83 is again operated, and articulated robotic arms 21 are then retracted to their original position, as shown by arrows 74 in FIG. 15A, and the disc has been transferred to the picker mechanism 20 with the original back side 64 now facing upwardly. The disc can then be placed back on the support surface or table of the playback unit, or else positioned in a sliding tray 15 when the robot is given instructions to retrieve another disc.

It is pointed out that while the robot is at its position of use in front of the playback units 13, and has retracted a disc from one of these units, it does not immediately return the disc to the storage trays. This is only effectuated once the robot is given instructions to retract another disc. When another disc is retracted, the disc held by one of the robotic arms will be placed back in the same disc retaining cavity of the same tray where a disc has just been withdrawn, and the computer controller will maintain the new location of this stored disc in memory for future retrieval.

It is also pointed out that the robot can also interchange discs between storage sliding trays. The computer can also maintain the time the PC unit was occupied, and can transmit this information as well as other information to another computer for purposes of processing order or invoicing, etc. Accordingly, with the system as above described, there can be provided a fully automated system having a multitude of capabilities. Also the storage bays and construction of the storage frames and sliding trays provide for expandable storage space and a means for storing a great number of discs in dense compact space with ease of retrieval of the discs.

It is within the ambit of the present invention to cover any obvious modifications of the preferred embodiment described herein, provided such modifications fall within the scope of the appended claims.

We claim:

1. An automatic disc handling system for retrieving and positioning information carrying discs between a storage means to a position of use where there is provided one or more disc information retrieving devices operated by end user command, said system comprising pivotable robot means having a pair of robotic arms, each of said arms having actuable engaging means for engaging and disengaging one of said discs, said storage means having a plurality of superposed sliding trays containing one or more disc retaining cavities on a top surface thereof, said sliding trays having engageable means for the displacement of said trays from said storage means to a retracted loading or unloading position, said robot means having tray engaging means for engaging said engageable means of a selected one of said trays to displace the same from said storage means to said loading or unloading position and back to said storage means, a control means to cause said robot means to move to a selected position and cause one of said robotic arms to engage a selected one of said discs at a selected location at said storage means or position of use and to effect a specific work function, said pair of robotic arms being individually controllable pivotal arms, said arms each having a picker mechanism at a free end thereof, said picker mechanism engaging a disc for displacement and release of said disc at a desired location, said pair of robotic arms being pivotally connected to said pivotable robot means for simultaneous movement about a respective pivot connection, said control means controlling the pivoting of said arms to cause said disc engaged by said mechanism of one of said arms to be transferred to said picker mechanism of the other arm to invert said disc.

2. An automatic disc handling system as claimed in claim 1, wherein said information carrying discs are laser discs, said one or more disc information retrieving devices being comprised by one or more of laser disc playback units in a selected one of which said selected disc is positioned, and wherein there is further provided user control means to access selected ones of said discs, and monitor means to receive information recorded on said selected one of said discs.

3. An automatic disc handling system as claimed in claim 2 wherein said laser discs and are video laser discs, said laser disc playback units being video laser disc playback units.

4. An automatic disc handling system as claimed in claim 3, wherein said position of use is a remote position of use connected to said control means through a modem.

5. An automatic disc handling system as claimed in claim 2 wherein said laser discs are video laser discs, said laser disc playback units being video laser disc playback units, said monitor means comprising a speaker system.

6. An automatic disc handling system as claimed in claim 2, wherein said control means is a computer control means responsive to said user control means, said user control means identifying said selected one of said discs and feeding demand signals to said computer control means representative of said selected one of said discs, said computer control means locating said selected one of said discs from a memory bank and transmitting command signals to said control means connected to said robot means to position said selected one of said discs in a computer selected one of said playback units for control by said user control means.

7. An automatic disc handling system as claimed in claim 1, wherein said storage means has a frame supporting said superposed sliding trays in a close parallel stacked relationship and disposed along an arc of a fixed central pivot axis of said robot means, said engageable means being an engageable aperture formed in a front edge of each of said sliding trays, said tray engaging means being a finger element which is caused to enter and engage said engageable aperture and to displace said tray to and from said storage means or said loading or unloading position.

8. An automatic disc handling system as claimed in claim 7, wherein said engageable aperture has an undercut groove to one side thereof to define an engageable lip on a right or left side of said aperture, said sliding trays being positioned with said lip in alternating sequence to provide greater tolerance between adjacent right or left sided engageable lips and to provide very close spacing of said trays.

9. An automatic disc handling system as claimed in claim 8, wherein said finger element is a T-shaped finger element having opposed engaging arms at a free end thereof for engaging one of said right or left lips, and optical sensing means associated with said finger element to align with said engageable aperture.

10. An automatic disc handling system as claimed in claim 7 wherein said engageable aperture is a hole formed in a flat horizontal tab protruding from a front edge of said trays, said tabs of adjacent trays being vertically offset from one another.

11. An automatic disc handling system as claimed in claim 10 wherein said finger element is an L-shaped tray engaging rod defining a right angled engaging end for engagement in said hole of a tab of a selected tray.

12. An automatic disc handling system as claimed in claim 7, wherein said trays are rectangular trays having two or more of said disc retaining cavities on said top surface thereof.

13. An automatic disc handling system as claimed in claim 7, wherein there is provided a plurality of said frame on opposed sides of a plurality of said disc information retrieving devices.

14. An automatic disc handling system as claimed in claim 13, wherein said robot means is disposed on a central pivot axis, said plurality of frames and said disc information retrieving devices being disposed on a diametrical arc of said pivot axis to minimize work function time of said robot means.

15. An automatic disc handling system as claimed in claim 1, wherein each of said picker mechanisms is an air-operated mechanism controlled by said control means.

16. An automatic disc handling system as claimed in claim 1, wherein each of said picker mechanisms comprises fixed disc abutment means and articulated disc aperture engaging fingers, said engaging fingers being displaced from a retracted position to an expanded disc engaging position, said engaging fingers being secured to axially displaceable actuating support means.

17. An automatic disc handling system as claimed in claim 16, wherein said disc abutment means is comprised by at least two abutment members spaced apart to abut a respective outer surface portion of a disc to be engaged and on a respective side of a circular disc engaging aperture formed at a center of said disc.

18. An automatic disc handling system as claimed in claim 16, wherein there are two or more of said engaging fingers spaced from one another, said fingers being pivotally secured to said axially displaceable support means and extending in closely-spaced alignment when in said retracted position, each of said fingers having a hook end, said fingers when in said disc engaging position, extending over an edge portion of said disc on a surface opposite a disc surface abutted by said disc abutment means, said hook end of said fingers urging said disc in clamping position between said hook ends and said abutment means when said axially displaceable support means is axially retracted.

19. An automatic disc handling system as claimed in claim 18, wherein said axially displaceable support means is a piston actuated carriage secured to guide means, and an actuable pivoting mechanism secured to said carriage to cause said fingers to pivot between said disc engaging position and said retracted position.

20. An automatic disc handling system as claimed in claim 19, wherein there are three of said abutment means and three of said engaging fingers equidistantly spaced along a respective concentric circumferential axis, said fingers being spaced along an inner circumferential axis.

21. A method of automatically retrieving and positioning information carrying discs between a storage position where said discs are stored on a plurality of horizontally disposed sliding trays stacked in vertical columns to a position of use in a disc playback unit, said method comprising the steps of:
  i) identifying a disc to be retrieved and to be positioned in said playback unit,
  ii) displacing a robot having a pair of pivoting robotic arms to a position where said disc identified is located, each robotic arm having a picker mechanism at a free end thereof,
  iii) causing said disc to be positioned to a retrievable position,
  iv) displacing one of said robotic arms of said robot to a disc engaging position to align the picker mechanism of the displaced robotic arm above said disc,
  v) causing said picker mechanism of the displaced robotic arm to engage said disc,
  vi) moving said robot to said playback unit,
  vii) simultaneously pivoting said arms about a common central pivot axis to cause said disc engaged by said one of said picker mechanism of the displaced robotic arm to be transferred to said picker mechanism of the other arm to invert said disc, and
  viii) releasing said disc on a support base of said playback unit.

22. A method as claimed in claim 21, wherein said step (iii) comprises:
  a) positioning a tray engaging means of said robot in an engageable aperture formed in a front end of an identified tray having said disc identified to be retrieved,
  b) engaging said tray engaging means with said engageable aperture, and
  c) retracting said tray engaging means and said tray from a storage position to said retrievable position.

23. A method as claimed in claim 22, wherein after step (iv) there is further provided the steps of:
  a) positioning disc aperture engaging fingers through a disc aperture of a disc to be retrieved,
  actuating said aperture engaging fingers to move from a retracted position to an expanded disc engaging position,
  c) retracting said engaging fingers to displace said disc, in clamping engagement between said fingers and abutment means on a top surface of said disc adjacent said disc aperture,
  d) displacing said robotic arm away from said retrievable position,
  e) pushing said tray back to said storage position.

24. A method as claimed in claim 22, wherein said step (vii) comprises:
  a) pivoting said robotic arms with aperture engaging fingers of one arm having said identified disc secured thereby so that said engaging fingers of said pair of arms are aligned about a common axis extending through the center of a disc aperture and abutment means of both arms contact a respective side of said disc,
  b) moving said engaging fingers of said other arm in a retracted position to enter through said disc aperture, c) actuating said engaging fingers of said other arm to move to an expanded disc engaging position, d) actuating said engaging fingers of said one arm to move to a retracted position, and e) pivoting said robotic arms back to their original position prior to step (a).

25. A method as claimed in claim 21, wherein said step (i) comprises:

a) identifying said disc to be retrieved, b) feeding demand signals to a computer control means, and c) identifying the location of said disc in a specific one of said sliding trays.

\* \* \* \* \*